United States Patent [19]

Benattar et al.

[11] Patent Number: 4,786,410
[45] Date of Patent: Nov. 22, 1988

[54] FLUID TREATMENT APPARATUS WITH SEMI-PERMEABLE MEMBRANES, USEFUL AS A HAEMODIALYSER

[75] Inventors: Robert Benattar, Lyons; Michel Cronenberger, Givors, both of France

[73] Assignee: Hospal Industrie, Meyzieu, France

[21] Appl. No.: 11,996

[22] Filed: Feb. 6, 1987

Related U.S. Application Data

[63] Continuation of Ser. No. 707,669, Mar. 4, 1985, abandoned, which is a continuation of Ser. No. 482,516, Apr. 6, 1983, abandoned, which is a continuation of Ser. No. 314,546, Oct. 26, 1981, abandoned.

[30] Foreign Application Priority Data

Dec. 31, 1980 [FR] France ............................ 80 27982

[51] Int. Cl.⁴ .............................................. B01D 13/00
[52] U.S. Cl. .............................. 210/321.72; 210/493.2; 210/500.34; 210/500.43
[58] Field of Search ................ 210/321.1–321.5, 210/433.1, 433.2, 493.1, 493.2, 541; 55/158; 422/48

[56] References Cited

U.S. PATENT DOCUMENTS

| 3,734,298 | 5/1973 | Riede et al. ................... 210/541 X |
| 3,907,687 | 9/1975 | Hoeltzenbein ................... 210/321 |
| 4,053,417 | 10/1977 | Newman ....................... 210/321 |
| 4,113,625 | 9/1978 | Riede ............................ 210/321 |

FOREIGN PATENT DOCUMENTS

| 2287256 | 5/1976 | France ........................ 210/321.2 |
| 2305214 | 11/1976 | France ........................ 210/321.2 |
| 2400380 | 4/1979 | France ........................ 210/321.1 |

Primary Examiner—Frank Sever
Attorney, Agent, or Firm—Gerald D. Sharkin; Robert S. Honor; Walter F. Jewell

[57] ABSTRACT

The invention relates to a fluid treatment apparatus resulting from the stacking of plates 1 each having, on each of their two main faces, a treatment zone 3 provided with ribs 2, the two membranes being placed between the opposite faces of each adjacent plate 1 of the stack. The two membranes between each adjacent plate are held at a multiplicity of points by the ribs of adjacent plates, at least one rib, and preferably both, at each such point having at least one portion 14 of maximum height H only over a length l which is less than the total length L of that rib or the distance between maximum height portions on that rib. The apparatus is particularly useful in the medical field, especially as a haemodialyser.

8 Claims, 3 Drawing Sheets

FLUID TREATMENT APPARATUS WITH SEMI-PERMEABLE MEMBRANES, USEFUL AS A HAEMODIALYSER

DESCRIPTION

This application is a continuation of application Ser. No. 707,669, filed Mar. 4, 1985 now abandoned, which application is a continuation of application Ser. No. 482,516 filed Apr. 6, 1983 now abandoned, which application is a continuation of application Ser. No. 314,546 filed Oct. 26, 1981, now abandoned.

BACKGROUND OF THE INVENTION

The present invention relates to fluid treatment apparatus, which can be used for example as an artificial kidney for haemodialysis and for ultrafiltration.

One form of apparatus of this type comprises a stack of plates each having ribs on their faces with two semi-permeable membranes between each pair of adjacent plates of the stack. The ribs on two adjacent plates and on which the membranes rest can be disposed at an angle to one another.

Apparatuses of this type are already known for the same use, but a new problem has now presented itself to those skilled in the art, because the recent membranes, which have been improved in respect of the performance characteristics relating to the exchanges of matter, that is to say the dialysis exchanges, have also been improved in respect of their ultrafiltration performance characteristics. Now, it is known that, for the treatment of patients by haemodialysis, it is necessary to limit the ultrafiltration during the sessions or, if appropriate, during periods of a session. In view of the fact that, for safety reasons, the blood which circulates between the membranes is at a higher pressure than the dialysis liquid circulating between the ribs and in contact with the plates, those skilled in the art have observed that, with the apparatuses which are provided with plates comprising conventional ribs, the pitch of which is generally less than 3 mm, it is impossible, with recent high-performance membranes, to limit the ultrafiltration in the desired manner, in particular in the region of 200 ml/hour/m² (milliliters per hour and per m² of useful membrane surface area).

SUMMARY OF THE INVENTION

It is now proposed, according to the present invention, to provide fluid treatment apparatus comprising:
(a) a stack of superposed plates;
(b) a semi-permeable membrane on each of the opposite major faces of each plate of the stack;
(c) a fluid treatment zone on each of said major faces of each plate;
(d) means for feeding fluid to be treated to the location of one end of the treatment zone on each face of each plate and between the two membranes located between adjacent plates and withdrawing it from between said two membranes at the other end of said treatment zones;
(e) means for feeding a treating fluid at the location of one end of the treatment zone on each face of each plate and between said face and the adjacent membrane, and means for withdrawing the treating fluid therefrom at the other end of the treatment zone;
(f) a plurality of membrane supporting ribs upstanding from the major faces of each plate, the two membranes between each adjacent plate being held at a multiplicity of points by the ribs of adjacent plates, at least one rib at each such point having at least one portion of maximum height H only over a length l which is less than the total length L of that rib, or the distance between adjacent maximum height portions on that rib.

With such an apparatus it is possible to reduce the ultrafiltration rates to low values, whilst at the same time having high dialysis performance characteristics. For example, if the apparatus is used in such a way that the blood flows between two semi-permeable membranes of high ultrafiltration performance characteristics, at a higher pressure than the dialysis liquid, it is possible to obtain ultrafiltration rates as low as 200 ml/hour/m² and even less, whilst at the same time having good dialysis performance characteristics.

Another advantage of the construction of the present invention is that it is possible to construct it so that it has a small volume for the blood. Furthermore the thickness of the "blood film" between the membranes varies periodically, which improves the dialysis exchange. Also the area of the passage available for the blood circulating between the membranes varies periodically relative to its general direction of advance, the membranes being constantly supported by the ribs.

BRIEF DESCRIPTION OF THE DRAWINGS

In order that the present invention will be more fully understood, the following description is given, merely by way of non-limiting example, reference being made to the accompanying drawings in which:

Referring first to FIG. 1 a plate 1, of general elongate shape, has a longitudinal axis Δ and a treatment zone 3 on each of its main faces, that is to say the two faces having the greater surface area. These two zones, which are arranged back-to-back, are separated by a thin wall 4, as shown more clearly in FIG. 4. At its periphery, the plate 1 has longitudinal ridges 5 and transverse ridges 6. FIG. 1 only shows part of the plate 1 because a plate of this type is advantageously symmetrical relative to a median plane perpendicular to its longitudinal axis Δ. The plate 1 has, on each face, a distribution zone 7 at each of its ends, each zone 7 comprising, for example, small projecting points 8, on which the membrane adjacent to this face of the plate rests. The two distribution zones 7 of one end of a plate are arranged back-to-back and separated from one another by a thin wall 9, as shown in FIG. 3. On each plate such as that shown in FIG. 1, a longitudinal ridge 5 has two parts 10 of lesser height adjacent each distribution zone 7, towards each end of the plate, as shown more clearly in FIG. 2. Furthermore, the other longitudinal ridge 5 has, in the region of each pair of distribution zones 7 at each end of the plate 1, an internal channel 11 which communicates via a hole 12 provided in the thin wall 9 with the distribution zones 7, as is shown more clearly in FIG. 3.

Each plate 1 such as that described above is provided with a membrane covering each of its faces, the membrane being turned around the longitudinal ridge 5 having the part 10. The membrane of each plate thus forms a U, the bend of which completely covers the longitudinal ridge 5 having part 10, whilst the arms of the U cover each face of the plate in question. The parts 10 thus form exposed channels on each face of each plate, the membrane overlying and extending into these exposed channels to provide locations where the fluid to be treated, e.g. blood, may be introduced between the two membranes located between adjacent plates and, at the other end of each plate, locations where the fluid which has been treated may be discharged from between the membranes.

Figure 1:
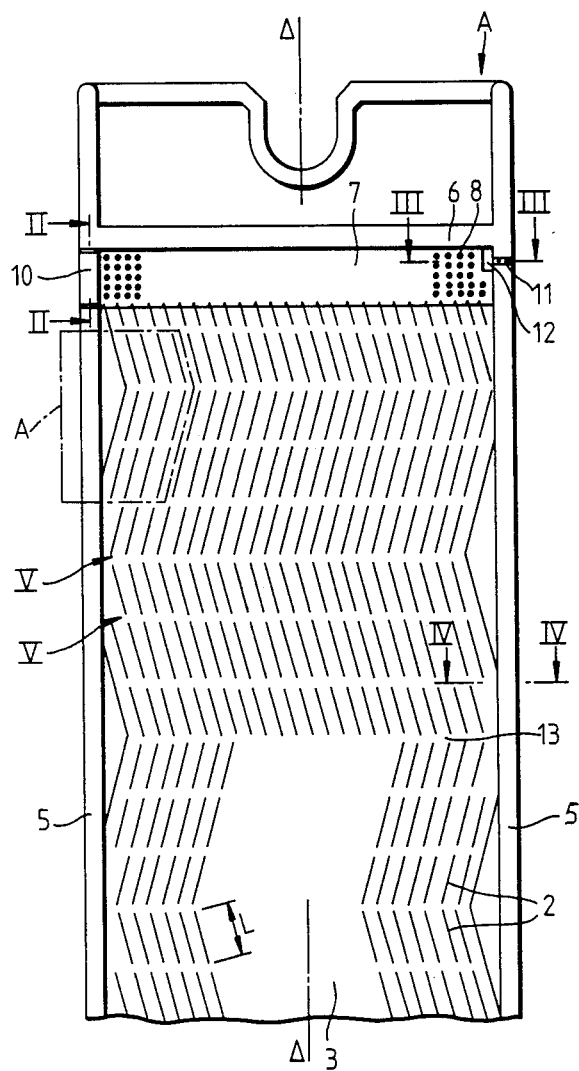
FIG. 1 is a plan view of a part of one embodiment of a plate used in an apparatus according to the present invention.
Figure 2:
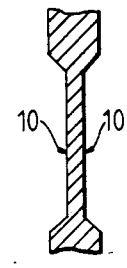
FIGS. 2, 3 and 4 are each enlarged cross-sections through parts of the plate and taken along the lines II—II, III—III and IV—IV respectively of FIG. 1.
Figure 3:
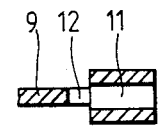
Figure 4:
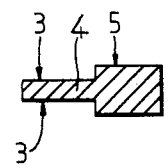
Figure 11:
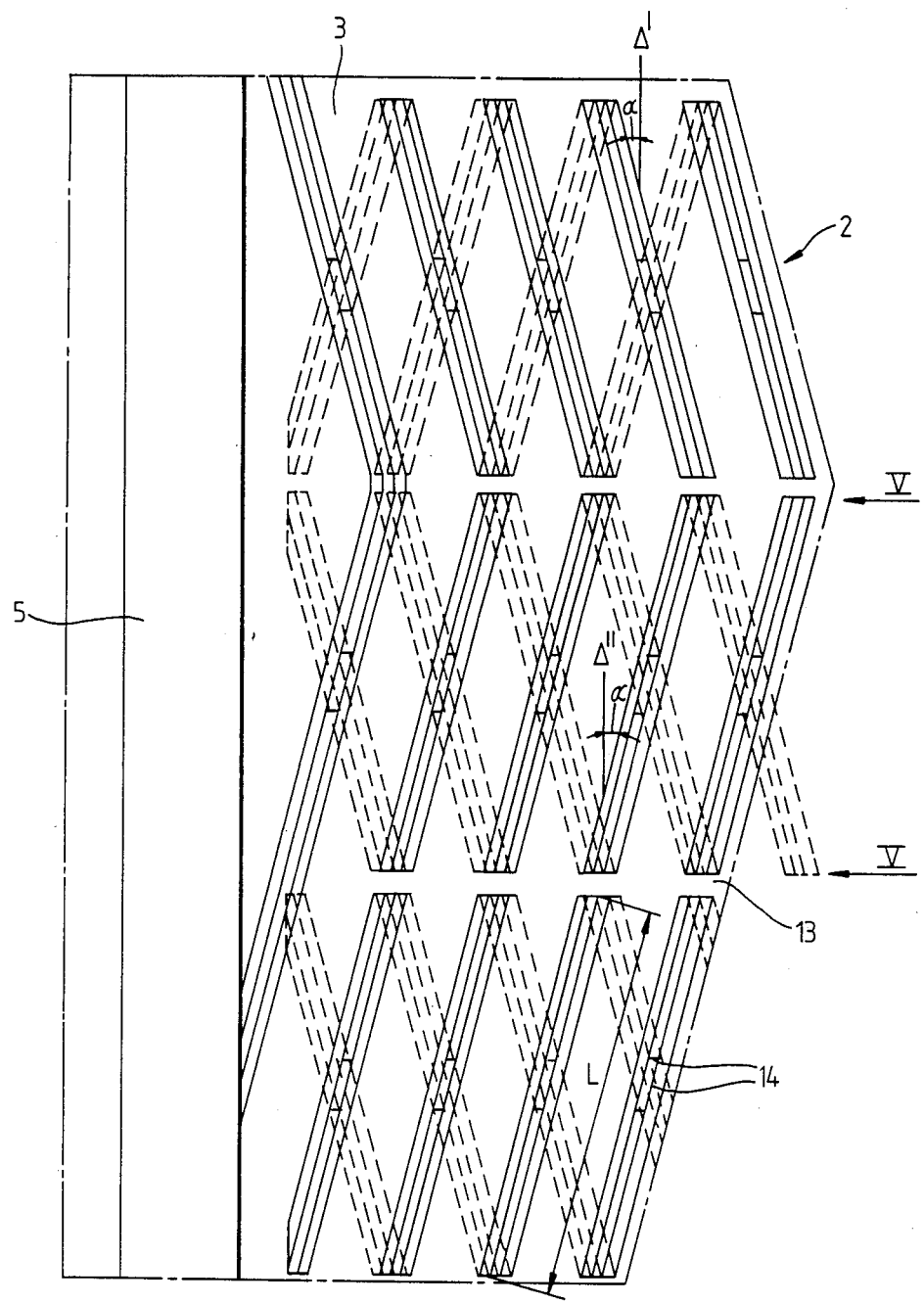
FIG. 11 is an enlarged fragmentary plan view showing, in greater detail, that part of the plate shown in FIG. 1 within the polygon A.

Each plate 1 has ribs 2 on each of its faces, the base of the ribs 2 resting on the bottom of the treatment zones 3. Each rib 2 of each face has a zig-zag profile, as shown in FIG. 1 or FIG. 11. Advantageously, each rib 2 forms an angle $\alpha$, having an absolute value of between 10 and 45 degrees, with the longitudinal axis $\Delta$ of the plate. As shown in FIG. 11, if the ribs 2 of one face form an angle $\alpha$ with the longitudinal axis $\Delta$ of the plate, the ribs of the other face of the plate in question advantageously form an angle $-\alpha$ with the same longitudinal axis, and vice versa, the straight lines $\Delta'$ and $\Delta''$ being parallel to the longitudinal axis $\Delta$ shown in FIG. 1. Thus, the ribs of one face are arranged in the opposite sense to those of the other face, so that two ribs in back-to-back relation are at an angle of $2\alpha$ to one another as can be seen from FIG. 11.

In the embodiment of the plate shown in FIGS. 1 and 11, there are transverse channels 13 perpendicular to the longitudinal axis $\Delta$ of the plate these channels 13 crossing the ribs substantially down to the bottom of each treatment zone 3 and serving to assist the distribution and delivery of the blood circulating between the membranes supported over the whole length of the ribs 2. These transverse channels 13 are advantageous but are not essential for a plate having ribs according to the present invention.

Figure 6:
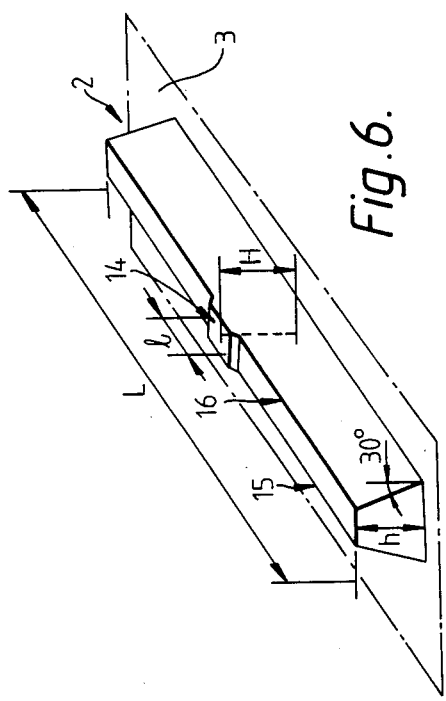
FIG. 6 is a perspective view of a rib according to FIG. 5.
Figure 5:
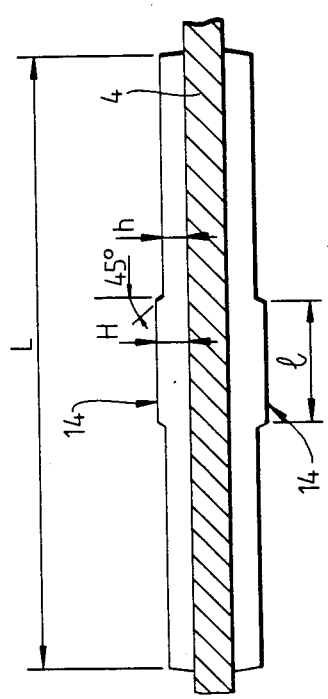
FIG. 5 is a still further enlarged cross-section taken along the line V—V of FIG. 1, showing one embodiment of the rib on the plate.

FIGS. 5 and 6 show a preferred embodiment of the ribs 2 of the plates of the apparatus according to the present invention. Over a length L, each rib 2 of each face of the plate 1 has a portion 14 of length l, for which the height H of the rib is a maximum, relative to the bottom of the treatment zone 3 containing the rib 2, whilst, on either side of this portion 14 of maximum height H, each rib 2 has a constant height h, which is less than H, the height h being measured relative to the bottom of the treatment zone 3, and the ratio l/L generally being between 0.1 and 0.3 and preferably between 0.15 and 0.25. The length L is generally between 5 and 15 mm and, in the case of the plate shown in FIGS. 1 and 11, corresponds to the length of each rib 2 between two transverse channels 13. The length L corresponds to the distance between two portions of maxiumum height H, on one and the same rectilinear rib of angle $\alpha$ or $-\alpha$. The cross-section of a rib is advantageously of trapezoidal shape (see FIG. 6) but the top edges 15 and 16 are generally rounded so as to avoid tearing the membrane resting on the rib. Likewise, the portion 14 of maximum height H is connected to the two adjacent parts of the rib of height h, by a transition section advantageously inclined at 45 degrees, to the surface of portion 14, and the edges of the portion 14 are advantageously rounded. As regards the difference between the heights H and h for a rib such as that shown in FIG. 6, this is between 50 and 100 microns, the height h itself being between 0.2 and 0.6 mm. Furthermore, in the plate such as that shown in FIGS. 1 and 11, the height of the lateral ridges 5 and transverse ridges 6, relative to the bottom of the treatment zone 3, corresponds to the height of the portion 14 of maximum height H, relative to the bottom of the treatment zone 3.

Thus, in an apparatus having plates which are provided with ribs such as those described above, two successive plates come into contact, via the two membranes arranged between them, at the portions 14 of the opposite and intersecting ribs 2 and around the peripheral ridges 5 and 6. As explained above FIG. 11, which shows the ribs 2 of one face of a plate and the ribs 2 of the other face of the same plate, makes it possible to see this, it being supposed now that the ribs 2 drawn in solid lines represent the ribs of one plate and that the ribs in broken lines represent the ribs of the opposite face of the adjacent plate.

In an apparatus which is provided with plates 1 having ribs 2 such as those described above and shown more particularly in FIGS. 5, 6 and 11, the blood enters the distribution zone 7, between the two membranes of two adjacent plates, at the location of the parts 10 at one end and then follows, between each membrane, a path substantially corresponding to the longitudinal axis $\Delta$ of the plate, and comes out again, at the other end of the plates, at the location of the parts 10 associated with the other distribution zone 7.

The dialsis liquid enters the two distribution zones 7 at one end of each plate, through an internal channel 11 and holes 12, and then flows in contact with the bottom of the treatment zones 3 of each plate, channeled between the ribs 2 and following their zig-zag arrangement, and substantially has a path corresponding to that of the longitudinal axis $\Delta$ of each plate. The dialysis liquid then arrives at the other distribution zones 9 and leaves through the holes 12 and internal channels 11 in the plates. The dialysis liquid advantageously follows a path in counter-current to that of the blood.

In order to obtain comparative results, membranes of high ultrafiltration performance characteristics, marketed under the name AN 69 and obtained from a collodion comprising an acrylonitrile/sodium methallylsulphonate copolymer (the percentage by weight being 91 and 9% respectively), were mounted on two apparatuses. One of the apparatuses corresponded exactly to the apparatus having plates 1 and ribs 2 such as those shown in FIGS. 1, 2, 3, 4 and 11. In this apparatus, the absolute value of the angle $\alpha$ formed by the ribs 2 with the longitudinal axis $\Delta$ of a zig-zig arrangement and the length L corresponded to 9.25 mm, l corresponding to 2 mm. The height H of the portion 14 was 0.5 mm and the difference H−h was 80 microns. The surface area of each face of a plate having ribs was 6.65 cm×26.1 cm, the pitch of the ribs being 2.5 mm, and the width of the ribs in their portions 14 of maximum height H being 0.2 mm, the angle formed by the lateral faces of the ribs 2 with a straight line perpendicular to the bottom of the chambers being 30 degrees. The second apparatus had all the characteristics and dimensions of the first apparatus, except as regards the ribs of each face of the plates, which were all of a strictly constant height equal to 0.5 mm, relative to the bottom of the treatment zone. Using the two apparatuses, each of them having the same membrane surface area ($\simeq 1$ m$^2$), under the same conditions, that is to say a blood circulation of 200 ml/minute and a dialysis liquid circulation of 500 ml/minute, with the apparatus having the ribs with portions 14 of maximum height H, it was possible to limit the ultrafiltration rate to 200 ml/hour/m$^2$, whereas with the second apparatus having ribs of strictly constant height over their whole length, the minimum ultrafiltration rate was more than 1 liter/hour/m$^2$, the two apparatuses having been subjected to an equal compression force on the stack. As regards the dialysis performance characteristics, they were of the same order for both apparatuses.

Figure 8:
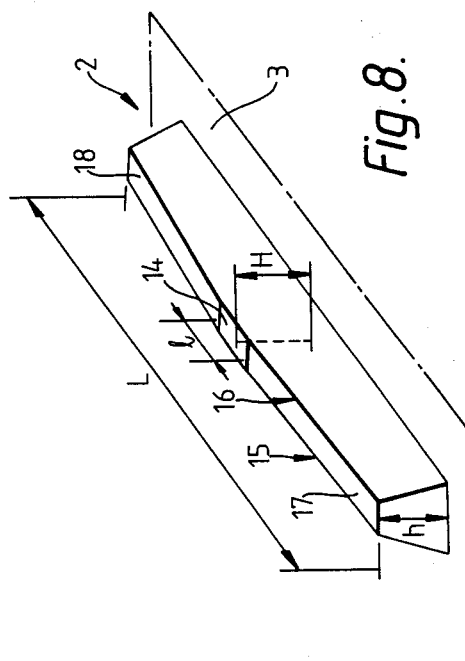
FIG. 8 is a view in perspective of the rib according to FIG. 7.
Figure 7:
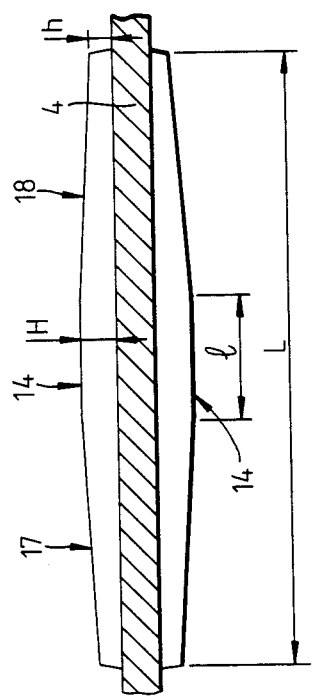
FIG. 7 is a view similar to FIG. 5 and showing another embodiment of the rib on the plate.

FIGS. 7 and 8 show another embodiment of the ribs 2. Like those of FIGS. 5 and 6, described above these ribs 2 form an angle $\alpha$ or $-\alpha$ with the longitudinal axis $\Delta$ of a plate, and have a portion 14 of maximum height H and of length l. These ribs 2 according to FIGS. 7 and 8 differ from those according to FIGS. 5 and 6 by the fact that they have, on either side of the portion 14, over a rib length L in question, two sections 17 and 18 of decreasing height, these sections 17 and 18 being advantageously distributed symmetrically relative to the portion 14. The ratio l/L is generally between 0.1 and 0.3 and preferably between 0.15 and 0.25. The length L is generally between 5 and 15 mm and corresponds to the length of a rib 2 between two transverse channels 13, in the case of the plate according to FIGS. 1 or 11. The cross-section of a rib, shown in FIG. 8, shows that it is advantageously of trapezoidal shape, but the edges 15 and 16 are generally rounded so as to avoid tearing the membrane resting on the said rib. As regards the difference between the heights H and h, this is advantageously between 50 and 200 microns, the height h itself being between 0.3 and 0.6 mm, and representing the minimum height of the rib over the length L in question. FIGS. 1, 2, 3, 4 and 11 can be considered as showing a plate 1 which is provided with ribs such as those described above with reference to FIGS. 7 and 8. Thus, the intersecting ribs of the opposite faces of two successive plates are in contact, via the membranes, along the portions 1 of maximum height H and of length l.

Figure 9:
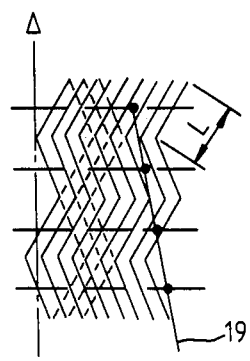
FIGS. 9 and 10 are fragmentary plan views showing a modified arrangement of the ribs on the plate.
Figure 10:
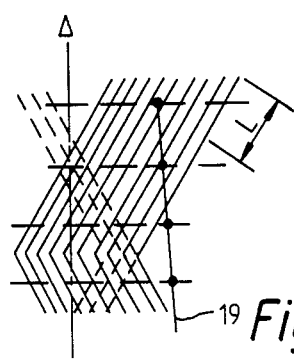

As has already been mentioned in the description of the plate according to FIGS. 1, 2, 3, 4 and 11, provided with ribs according to FIGS. 5 and 6 or 7 and 8, it is not imperative, but only advantageous, for the ribs to be intersected by transverse channels 13 perpendicular to the longitudinal axis $\Delta$ of the plate. In the plate shown in FIGS. 1 and 11, each rib, over substantially its whole length between the two distribution zones 7, is crossed by four transverse channels 13 when it forms an angle $\alpha$ with the longitudinal axis $\Delta$ of the plate, and it is also crossed by four transverse channels 13 when it forms an angle $-\alpha$ with the same axis $\Delta$. However, each rib of angle $\alpha$ can be between only two transverse channels 13 and be followed immediately a rib of angle $-\alpha$, which is itself between only two transverse channels 13. FIGS. 9 and 10 show ribs which are not intersected by transverse channels, the lines 19, perpendicular to the longitudinal axis $\Delta$ of the plate, representing the points where the ribs of the opposite faces of two successive plates are in contact via the membranes therebetween. In FIG. 9, the continuous ribs form an angle $\alpha$ (with $\Delta$) over a length L, and then an angle $-\alpha$, also over a length L. In FIG. 10, the continuous ribs form an angle $\alpha$ over substantially three times the length L, and then form an angle $-\alpha$ over three times the same length L.

Numerous modified embodiments of the apparatus according to the present invention can be made. Thus, for example, it is possible that, between two successive plates, the face of one plate may have ribs according to FIG. 6, whilst the opposite face of the other plate has ribs according to FIG. 8. It is also possible that, in the apparatus according to the present invention, between two adjacent plates, the opposite faces may be in contact (via the membranes), along the lines of contact 19, by means of a portion 14 of maximum height H and of length l, provided on only one of the ribs, the latter rib then having the shape of that shown in FIG. 6 or of that shown in FIG. 8. The latter embodiment of the ribs between the opposite faces of two successive plates gives rise to numerous modifications, including, in particular, those described below:

an apparatus in which, between two successive plates, the opposite faces are in contact, along the lines of contact 19, by means of portions 14 of maximum height H, provided on the ribs of only one of the two faces, an apparatus in which, between two successive plates, the opposite faces are in contact, along the lines of contact 19, by means of portions 14 of maximum height H, provided on the ribs of one of the faces in the case of the line of contact 19, and then on the ribs of the other face in the case of the next line of contact 19, and so on, and an apparatus in which, between two successive plates, the opposite faces are in contact, along each line of contact 19 in question, by means of a portion 14 of maximum height H, provided on the rib of one face, and then by means of a portion 14 of maximum height H, provided on the rib of the other face for the next point of contact of the same line 19 in question, and so on, in alternation, on each line 19.

Thus, the present invention requires only that, between two successive plates, the ribs of the opposite faces intersect and come into contact (via the membranes) by means of at least one portion 14 of maximum height H and of length l, provided on at least one of the ribs of one of the said faces. In general, the ratio l/L is between 0.1 and 0.3 and preferably between 0.15 and 0.25, L representing either the total length of a rib of angle $\alpha$ (absolute value), or the distance between two points of contact of the ribs on one and the same rectilinear rib. The length L is generally between 5 and 15 mm.

It should be noted, furthermore, that, in an apparatus according to the present invention, the ribs of the opposite faces of two adjacent plates intersect, but that, if appropriate, it is possible for the ribs of one face not to form the same angle (absolute value), with the longitudinal axis $\Delta$ of the plates, as the ribs of the opposite face of the adjacent plate, at the points of contact in question. Likewise, the points of contact between the ribs of two adjacent plates are not necessarily on straight lines 19 perpendicular to the longitudinal axis $\Delta$ of the plates.

Although the apparatus according to the present invention has hitherto been described preferentially as having only one type of plate of which the ribs of each face are positioned so that they intersect when these plates are stacked, it is of course possible to provide two different types of plates to achieve the same result.

As regards the use of the apparatus according to the present invention, the construction of its ribs enables it to be applied not only to haemodialysis, but also, in particular, as a haemofiltration kidney or as a plasmapheresis apparatus.

We claim:

1. Hemodialysis apparatus comprising: means for providing minimum ultrafiltration rates whilst maintaining dialysis performance characteristics, including:
   (a) a stack of superposed plates, each plate being of elongate form and having a longitudinal axis;
   (b) two opposite major faces on each plate;
   (c) a semi-permeable membrane on each of said two major faces of each plate of the stack, the two membranes thus being located between adjacent plates of the stack;
   (d) means defining a fluid treatment zone on each of said major faces of each plate, each treatment zone having two ends;
   (e) means for feeding fluid to be treated to one end of the treatment zone on each face of each plate and between the two membranes and withdrawing it from between said two membranes at the other end of said treatment zones;
   (f) means for feeding a treating fluid at the location of one end of the treatment zone on each major face of each plate and between said major face and the adjacent membrane, and means for withdrawing the treatment fluid therefrom at the other end of the treatment zone;
   (g) a plurality of membrane supporting ribs upstanding from the major face of each plate, the ribs being disposed in a zig-zag arrangement on each major face of each plate, and intersecting with the opposite ribs on the adjacent major face, the two membranes between two successive plates being in contact at points where the opposite ribs intersect, at least one rib at each such point having at least one portion of maximum height H only over a length l, the ration l/L being between 0.1 and 0.3, L which is between 5 to 15 mm denoting either the length of a rectilinear rib having only one portion of maximum height H in its length, or the distance between two portions with a maximum height H following each other on a rectilinear rib when the ribs of two adjacent major faces clamp the membranes through the intermediacy of more than one portion of maximum height H on a rectilinear length of a rib, the ribs at each point where they intersect being at an angle $\alpha$ to the longitudinal axis of the plate on one face and being at an angle $-\alpha$ for the face of the adjacent plate, said angles $\alpha$ or $-\alpha$ being between 10° and 45°, in absolute value, with said longitudinal axis.

2. Apparatus as claimed in claim 1, wherein the supporting ribs on each face of each plate have at least one portion of maximum height H only over a length l which is less than the total length L of that rib, or the distance between adjacent maximum height portions on that rib, whereby the membranes are in contact at the points of such maximum height portions of intersection ribs.

3. Apparatus as claimed in claim 2, wherein the remaining parts of each rib other than said maximum height portions are of constant height h over their length.

4. Apparatus as claimed in claim 3, wherein the height difference H−h is between 50 and 100 microns and the length L is between 5 and 15 mm.

5. Apparatus as claimed in claim 2, wherein each rib has on each side of the portion of maximum height H a section of decreasing height.

6. Apparatus as claimed in claim 5, wherein said section decreases in height uniformly to a minimum height h, the height difference H−h being between 50 and 200 microns.

7. Apparatus as claimed in claim 1, wherein the ribs on each face of each plate are crossed by channels extending essentially perpendicular to the longitudinal axis of the plate, and thus substantially transversely to the paths of the fluid to be treated and of the treating fluid, the channels being spaced apart so that the portions of maximum height H are arranged at the half of the length L of each rib.

8. Apparatus as claimed in claim 1, wherein all the plates of the stack are identical.

* * * * *